UNITED STATES PATENT OFFICE 2,563,247

12,21-DIHALOPREGNANES AND PROCESS

Edward C. Kendall and Gerard A. Fleisher, Rochester, Minn., assignors to Research Corporation, New York, N. Y., a corporation of New York No Drawing. Application September 7, 1949, Serial No. 114,462

6 Claims. (Cl. 260—397.4)

In the course of an investigation on the elaboration of the ketol acetate side chain of 3(α),21-diacetoxy-11,20-diketo-12(α)-bromo-pregnane (I), an intermediate in the partial synthesis of adrenal cortical hormones, its reaction with bromine has been studied. The attack by this agent was expected to occur in the (α)-position to the 20-keto group rather than at C-9 or C-12 because of the well-known inertness of the 11-keto group in general. Pregnane derivatives without substitution at C-21 have been subjected to bromination and the first bromine entered position 17. With an acetoxy group at C-21 it was difficult to foresee whether the attack would occur in the same manner or rather at C-21, in which case a glyoxal derivative would be formed.

The following flow sheet will be of assistance in following the ensuing description.

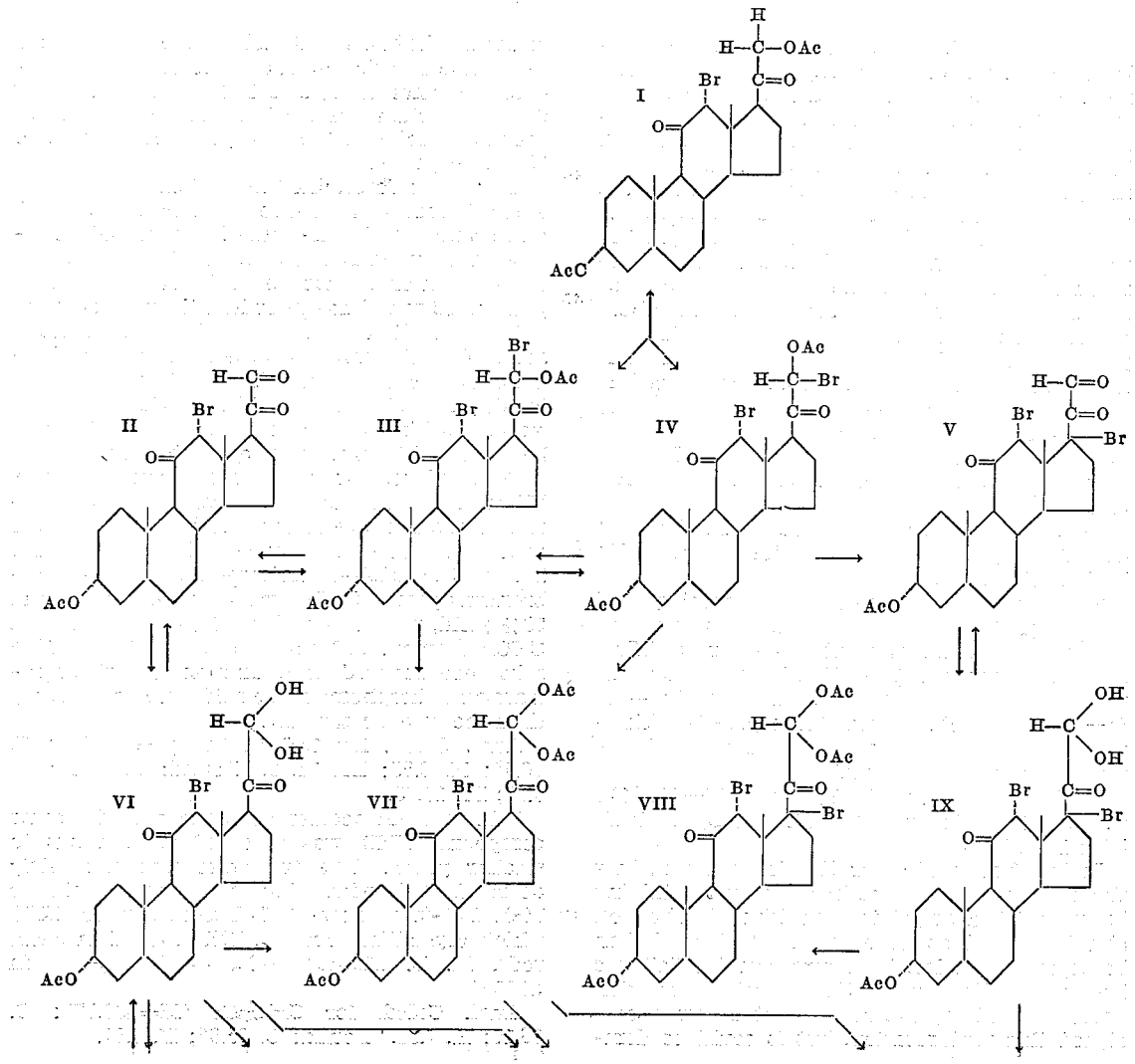

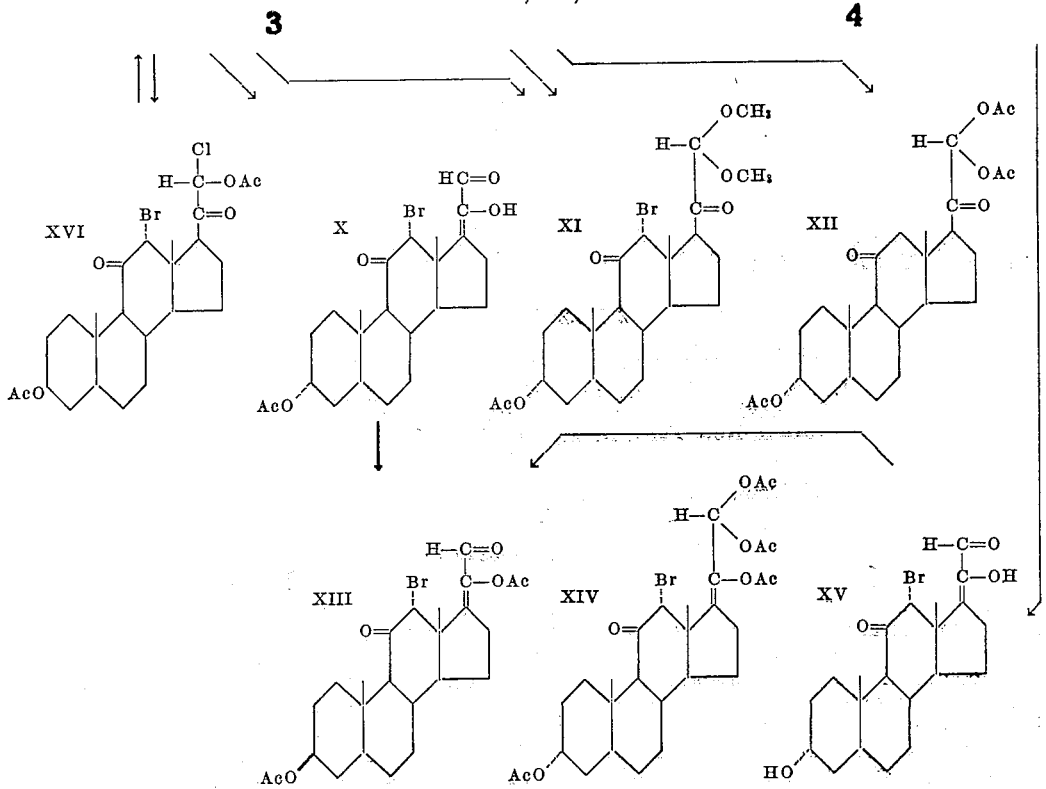

When 3(a),21-diacetoxy-11,20-diketo-12(a)-bromopregnane (I) was brominated with one mole of bromine in glacial acetic acid at room temperature with some HBr added to initiate the reaction, a small yield of crystals was isolated. However, when the bromination was carried out in dry chloroform at 0° with gaseous HBr as the catalyst, the reaction was complete in 4 hours and practically all of the material could be separated in crystalline form. Recrystallization from chloroform-ligroin revealed the presence of two isomeric compounds. The less soluble one, here referred to as bromide "a," (compound III) was present in somewhat larger amounts. It crystallized in flat plates, M. P. 180–182°, with strong decomposition. $(a)_D$ +139° (c=1% in chloroform; +133° (c=1% in HOAc). $\lambda$max. 312.5m$\mu$, $\epsilon$=276 (chloroform). Analysis showed that one additional bromine atom had entered the molecule.

Anal. Calcd. for $C_{25}H_{34}O_6Br_2$ (M=590.36): C, 50.86; H, 5.80; Br, 27.08. Found: C, 51.03; H, 5.99; Br, 26.41.

The more soluble compound, bromide "b," (compound IV) crystallized in prismatic needles. The pure crystals melted at 147–48°, resolidified, and melted again at 167–173° with strong decomposition. $(a)_D$ —94° (1% in chloroform); —73° (c=1% in HOAc). $\lambda$max. 313.5 m$\mu$, $\epsilon$=304 (chloroform). Analysis showed bromide "b" to be isomeric with bromide "a."

Anal. Calcd. for $C_{25}H_{34}O_6Br_2$ (M=590.36): C, 50.86; H, 5.80; Br, 27.08. Found: C, 50.74; H, 5.92; Br, 27.68.

In the process of separation it was noted that the rotation of the mother liquors containing bromide "b" changed in a positive direction on standing and that more bromide "a" could then be separated. Also, if impure bromide "a" was kept in solution longer than usual its rotation decreased. It is not known what impurity catalyzed this mutarotation, but it could be demonstrated that HBr had such an effect. A change in specific rotation of both pure compounds occurs in glacial acetic acid N/10 with HBr at 33° C. Equilibrium was reached when about 60 per cent of bromide "a" and 40 per cent of bromide "b" were present.

In order to determine the position of the newly entered bromine in both compounds (bromide "a" and bromide "b"), the following substitution reactions were carried out (it could be assumed from experience that the original bromine in position 12 would not enter into these reactions):

(1) Reduction with sodium iodide and acetic acid. In both compounds the newly entered bromine atom reacted remarkably fast with sodium iodide in glacial acetic acid and 3(a),21-diacetoxy-11,20-diketo-12(a)-bromopregnane (I) could be recovered in practically quantitative yield.

(2) Replacement with the acetoxy group. When either bromide "a" or bromide "b" was dissolved in a mixture of benzene and glacial acetic acid and shaken with excess silver acetate for 2 days, 3(a),21,21-triacetoxy-11,20-diketo-12(a)-bromopregnane (VII) was obtained in 88 and 89% yield, m. 169.5–170.5°; $(a)_D$ +35° (c~1% in CHCl$_3$), $\lambda$max. 310 m$\mu$, $\epsilon$=190 (MeOH). This substance reduced both ammoniacal silver nitrate and phosphomolybdic acid but less intensely than the ketol acetate (I).

Anal. Calcd. for $C_{27}H_{37}O_8Br$ (M=569.48): C, 56.94; H, 6.55; Br, 14.03. Found: C, 56.80; H, 6.30; Br, 13.75.

With sodium acetate in acetic acid the same compound (VII) was obtained from I but in smaller yields. The triacetate was completely debrominated with zinc and acetic acid to 3(a),21,21-triacetoxy-11,20-diketopregnane (XII) which crystallized from a little MeOH in short rods, M. P. 115–16°. $(a)_D$ +117° (c=1% in CHCl$_3$).

Anal. Calcd. for $C_{27}H_{38}O_8$ (M=490.57): C, 66.10; H, 7.81. Found: C, 65.96; H, 7.87.

When 3(a),21,21 - triacetoxy-11,20-diketo-12-(α)-bromopregnane (VII) was heated in methanolic HCl and subsequently reacetylated at C-3, 3(α)-acetoxy-21,21-dimethoxy - 11,20-diketo-12-(α)-bromopregnane (XI) was obtained in 80% yield. It crystallized in long, fine needles, M. P. 158–160° $(a)_D$ +30° (c~1% in CHCl₃).

Anal. Calcd. for $C_{25}H_{37}O_6Br$ (M=513.47); C, 58.47; H, 7.26; CH₃O, 12.09. Found: C, 58.56; H, 6.96; CH₃O, 12.00.

*Hydrolysis.*—Both bromo compounds (bromide "a" and bromide "b") react with aqueous pyridine almost as fast as they go into solution. When such a solution of either bromo compound was poured into excess sulfuric acid and filtered, one equivalent of bromide ion was found in the filtrate. The precipitate could be crystallized quantitatively from aqueous acetone or aqueous acetic acid (needles). It had the properties of a hydrated glyoxal, in that it formed yellow solutions in anhydrous solvents such as benzene, glacial acetic acid, chloroform, etc., but colorless solutions in alcohols or aqueous solvents. The yellow color was due to the free glyoxal II which exhibited a small band at 440 mµ, ε~20, where methyl glyoxal absorbs also. The compound reduced ammoniacal silver nitrate and liberated iodine from HOAC—NaI, though at a slower rate than the bromo compounds. The melting point of the hydrate was not sharp and depended on the rate of heating, as it lost water to give the glyoxal. When placed on the stage at 147° it melted at 149–51°. $(a)_D^{30}$ +28.0° (c~1% in CHCl₃). As the yellow color appeared in the chloroform solution the rotation dropped to $(a)_D$ +26° (calculated as glyoxal). The compound is, therefore, formulated as 3(α)-acetoxy-21,21 - dihydroxy-11,20-diketo-12(α)-bromopregnane (VI).

Anal. Calcd. for $C_{23}H_{33}O_6Br$ (M=485.51); C, 56.91; H, 6.85; CH₃CO, 8.86. Found: C, 56.80; H, 7.11; CH₃CO, 8.92. The free glyoxal II has not been obtained in crystalline form.

When the glyoxal hydrate VI was treated with methanolic HCl, followed by reacetylation, the dimethyl acetal (XI) was obtained which was identical with the product prepared from the triacetate VII. When the glyoxal hydrate VI was treated with acetic anhydride and a drop of concentrated H₂SO₄ the same triacetate VII was obtained, while treatment with acetyl bromide and H₂SO₄ yielded a mixture of bromoacetates from which pure bromide "a" (III) could be isolated $((a)_D$ +137°, M. P. 180–82°). The total rotation of the reaction product suggested the presence of over 40% of bromide "b," (compound IV) but in the attempted isolation it partially isomerized to bromide "a" (compound III). That no other reactions occurred with acetyl bromide is indicated by the observation that reduction of the whole product with sodium iodide in acetic acid gave an excellent yield of 3(α),21-diacetoxy-11,20-diketo-12(α)-bromopregnane (I).

It is believed that the foregoing reactions allow the conclusion that both bromo compounds III and IV are the C₂₁-diastereoisomers. This is also supported by a comparison of the optical rotations of related compounds. As long as carbon atom 21 is not asymmetric, substituents in that position have only relatively small effects on the optical rotation, as is shown in the following table. The mean of the rotation of the two bromides "a" and "b" falls well within the range.

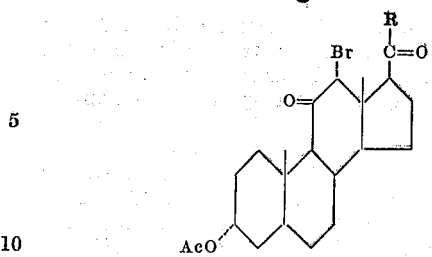

| R | $(a)_D$ (in CHCl₃) | $(M)_D$ |
|---|---|---|
| —CH₃ | ¹+25 | +1,130 |
| —CHO | +26 | +1,220 |
| —CH(OH)₂ | +28 | +1,360 |
| —COOCH₃ | ¹+31 | +1,540 |
| —CH(OCH₃)₂ | +30 | +1,540 |
| —CH₂OAc | ¹+33 | +1,690 |
| —CH₂Br | ¹+34 | +1,810 |
| —CH(OAc)₂ | +35 | +1,990 |
| —CHBrOAc: | | |
| Bromide "a" | +139 | +8,210 |
| Bromide "b" | −97 | −5,550 |
| Mean | | +1,330 |

¹ Unpublished.

When a pyridine solution of the glyoxal II or glyoxal hydrate VI was heated on the steam bath for one hour and the solvent then replaced with chloroform, an absorption band at 284 mµ was observed. It was subsequently found that more of the light absorbing material could be obtained by using a mixture of one part pyridine and four parts glacial acetic acid and heating at 60° for 16 hours. Further heating caused a gradual loss of the absorption after an optimum of about ε=6,200. The reaction also took place at room temperature, but required several days. Water was found to inhibit the reaction somewhat. Adsorption of the mixture on magnesium silicate-infusorial earth and elution with benzene left the non-absorbing material on the column and gave a crystalline product of M. P. 175–82° after removal of the benzene. Several recrystallizations from dilute acetone gave a product of M. P. 190–91° $(a)_D$ +96° (c=0.86% in chloroform), λ max.=284 mµ, ε=13,650 (chloroform); λ max. 282 mµ, ε=12,500 (MeOH).

This product reduced ammoniacal silver solution and showed a greenish brown color when a drop of alcoholic FeCl₃ solution was added to its solution in alcohol. With tetranitromethane it gave a weakly positive reaction. In chloroform solution it reacted with 1 mole of bromine within 15 minutes. These tests, the absorption curve and the analysis suggested that this compound is the enol derivative of the glyoxal, i. e., 3(α)-acetoxy - 20 - hydroxy - 11 - keto - 12(α)bromo-$\Delta^{17,20}$-pregnene-21-al (X).

Anal. Calcd. for $C_{23}H_{31}O_5Br$ (M=467.40): C, 59.09; H, 6.69; CH₃CO, 9.21. Found: C, 58.76; H, 6.94; CH₃CO, 9.79.

The absorption data are in agreement with those of the enol forms of α-diketones, as shown in the following table:

| Enol form of | λ (mµ) | ε | Ref. |
|---|---|---|---|
| 2,3-Diketocholestane: | | | |
| Form A | 272 | 5,000 (alcohol) | (5) |
| Form B | 270 | 8,500 (alcohol) | (5) |
| 3,4-Diketocholestane | 280 | 11,500 (chloroform) | (6) |
| 11,12-Diketocholanic acid | 281 | 8,700 (alcohol) | (7) |
| 3(α)-Hydroxy-11,12-diketocholanic acid | 281 | 7,000 (alcohol) | (8) |
| 1,2-Diketo-3-methyl cyclopentane | 257 | 15,300 (alcohol) | (7) |

Such enol derivatives were usually obtained with alcoholic KOH or NaOH, a process which is not applicable to a glyoxal, since it causes immediate rearrangement to the corresponding α-hydroxy acid.

On acetylation with pyridine-acetic anhydride the enol was converted to its acetyl derivative (XIII) of M. P. 162–64° (leaflets from dilute acetone). $(a)_D$ +86° (c~1% in chloroform), λ max.=246 mμ, ε=12,500 (ether). In methanol the absorption decreased continuously which may have been due to acetal formation. The substance did not give the $FeCl_3$-reaction for free enol; it reduced ammoniacal silver nitrate and took up bromine, though at a much slower rate than the free enol.

Anal. Calcd. for $C_{25}H_{33}O_6Br$ (M=509.43): C, 58.94; H, 6.53; $CH_3CO$, 16.90. Found: C, 58.92; H, 6.48; $CH_3CO$, 16.97.

The shift of the absorption maximum on acetylation from 284 mμ to 246 mμ is again in keeping with the observations on the enol derivatives of α-diketones wherein each case the enol acetate showed the normal absorption of an α-substituted α,β-unsaturated ketone.

It is interesting that the enol acetate (XIII) can be formed directly from either 21-bromo compound (III) or (IV) when treated with a mixture of equal parts of pyridine and glacial acetic acid, e. g. at room temperature for 2 days. Absorption analysis revealed that under such conditions there was formed over 30% of enol acetate together with a nearly equal amount of free enol while the remaining third did not absorb light and was perhaps polymerized glyoxal. When the glyoxal (II) was subjected to the same conditions, a similar amount of enol was formed, while the absorption band of the enol acetate was completely absent. This suggested that the enol was formed by way of the glyoxal, but that a different mechanism was involved in the formation of the enol acetate.

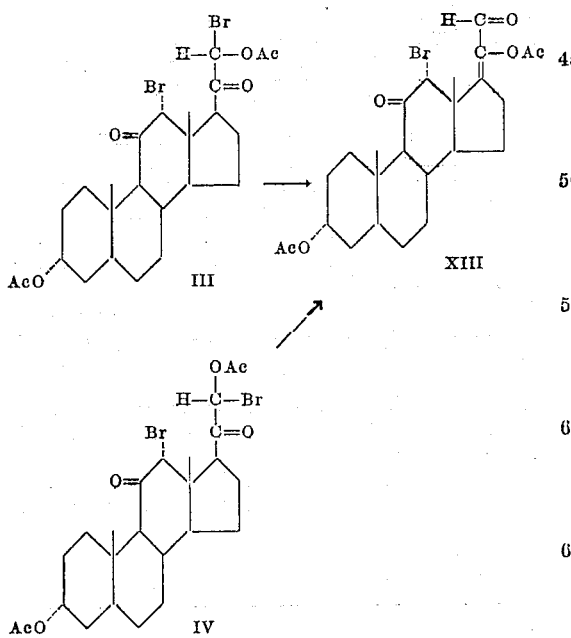

The enol acetate XIII was treated with acetic anhydride and a drop of concentrated $H_2SO_4$, and a good yield of 3,20,21,21-tetraacetoxy-11-keto-12-(α)-bromo-Δ17,20-pregnene (XIV) was obtained. After recrystallization, M. P. 154–55° (needles), $(a)_D$ +60° (c~1% in $CHCl_3$). The crystals did not give the enol reaction with $FeCl_3$. They absorbed 1 mole of bromine within 3 hours.

Anal. Calcd. for $C_{29}H_{39}O_9Br$ (M=611.52): C, 56.96; H, 6.43. Found: C, 57.11; H, 6.23.

When 3(α),21 - diacetoxy - 11,20 - diketo - 12-(α)-bromopregnane (I) was treated with a large excess of bromine and HBr in glacial acetic acid for 30 hours at 30°, a crystalline dibromo compound separated from the benzene extract in about 30% yield which had all the characteristics of a hydrated glyoxal. It formed yellow solutions in anhydrous solvents, but colorless solutions in methanol or aqueous solvents. The 17-bromo glyoxal V has not been separated in crystalline form but like the glyoxal II may be recovered as its hydrate IX. The yellow color was due to a small band at 423 mμ, ε~40. The melting point depended on the rate of heating. When the crystals were put on the hot stage at 203° they turned yellow immediately and melted with strong decomposition at 206–08°. $(a)_D$ −34.5° (c~1% in chloroform); the solution soon turned yellow and the rotation changed to $(a)_D$ −37° (calcd. as glyoxal). The compound analyzed as 3(α) -acetoxy - 21,21 - dihydroxy-11,20-diketo - 12(α),17(?) - dibromopregnane (IX).

Anal. Calcd. for $C_{23}H_{32}O_6Br_2$ (M=564.33): C, 48.95; H, 5.72; Br, 28.32, $CH_3CO$, 7.63. Found: C, 48.84; H, 5.74; Br, 28.20; $CH_3CO$, 8.27. When the crystals of IX were treated with acetic anhydride-$H_2SO_4$ a crystalline derivative was obtained, M. P. 167–69°, $(a)_D$ −24° (c~1% in chloroform). This is the 3(α),21,21-triacetoxy-11,20 - diketo - 12(α),17(?) - dibromopregnane (VIII).

When the 17-bromoglyoxal hydrate (IX) was heated in dilute methanol in the presence of excess $NaHSO_3$, crystals appeared after a few minutes which exhibited an absorption maximum at 284 mμ. After recrystallization from dilute acetone, M. P. 189.5–91°, $(a)_D$+101° (c~1% in chloroform) λmax.=284 mμ, ε=10,900 (methanol); it analyzed as a 3(α),20-dihydroxy-11-keto - 12(α) - bromo - $Δ^{17,20}$ - pregnene - 21 - al (XV), and must have been formed, therefore, by reductive removal of the bromine atom at C-17 together with hydrolysis at C-3.

Anal. Calcd. for $C_{21}H_{29}O_4Br$ (M=425.36): C, 59.29; H, 6.87. Found: C, 59.16; H, 6.89; no acetyl.

Compound XVI may be produced from compound VI by treatment with acetyl chloride and compound XVI may be reconverted into compound VI by treatment with pyridine.

Details of the procedures outlined above are given in the following specific examples:

*Preparation of starting material 3,21-diacetoxy-11,20-diketo-12-bromopregnane (I).* — This compound is prepared as described in the application of Edward C. Kendall, Serial No. 734,867, filed March 14, 1947, now abandoned. Compound II of said application, 3(α),21-diacetoxy - 11 - keto - 12 - bromo - 24,24-diphenyl-$Δ^{20:22,23:24}$-choladiene, is dissolved in ethyl acetate and treated with ozone at a temperature of of −78° until approximately 2 moles of ozone have been dissolved. By this treatment the diene is broken at the bond 20,22 and the compound 3,21 - diacetoxy - 11,20 - diketo - 12(α)-bromopregnane crystallizes from solution. Recrystallization of the material from chloroform-methanol raises the melting point to 164–165°. (All rotations were taken in chloroform (c~1%).)

*21-bromide "a" (III) and 21-bromide "b" (IV) from 3(a),21 - diacetoxy-11,20-diketo-12-(a)-bromopregnane (I).*—20.46 gm. 3(a),21-diacetoxy-11,20-diketo-12(a) - bromopregnane (40 mm.) dissolved in 400 cc. chloroform were cooled in an ice bath. To this was added 80 cc. of 1 N $Br_2$ in $CHCl_3$. With cooling, gaseous HBr was now passed into the flask for 10 minutes. The solution was allowed to stand in an ice bath for three hours. The straw-colored solution was concentrated under reduced pressure to a small volume, fresh chloroform added and again concentrated under reduced pressure. On adding much ligroin the material crystallized in about 95% yield and showed a specific rotation, $(a)_D = +34°$. When dissolved in 40 cc. chloroform and 200 cc. of ligroin added about one-half of the material crystallized, with $(a)_D = +106°$. After five recrystallizations in the same manner the rotation was constant at $(a)_D = +139°$. This compound, bromide "a," crystallized in flat plates, M. P. 180–182° with strong decomposition.

Anal. Calcd. for $C_{25}H_{34}O_6Br_2$ (M=590.36). C, 50.86; H, 5.80; Br, 27.08. Found: C, 51.03; H, 5.99; Br, 26.41.

From the mother liquor of the first recrystallization the other half of the reaction product was obtained by removing most of the chloroform under reduced pressure and adding a large amount of ligroin. A specific rotation $(a)_D = -38°$ was found for this fraction. When it was recrystallized from a little chloroform and much ligroin its rotation finally reached $(a)_D -94°$, after seven to nine recrystallizations. This compound, bromide "b," crystallized in prismatic needles, M. P. 147–48° with resolidification, then 167–73° with strong decomposition.

Anal. Calcd. for $C_{25}H_{34}O_6Br_2$ (M=590.36). C, 50.86; H, 5.80; Br, 27.08. Found: C. 50.74; H, 5.92; Br, 27.68.

*3(a),21 - diacetoxy - 11,20 - diketo - 12 - (a)-bromopregnane (I) from bromide "a" (III) and bromide "b" (IV).*—(a) 100 mg. purest bromide "a" was dissolved in 2 cc. benzene and 5 cc. glacial acetic acid. 200 mg. NaI was then dissolved in it and the mixture allowed to stand at room temperature for 15 minutes. Water was now added and the solution titrated. It used 3.4 cc. N/10 thiosulfate, the theoretical amount for 1 atom of bromide. The mixture was extracted with more benzene, the benzene extract washed with water, sodium bicarbonate and again with water, and evaporated to dryness. The crystalline residue was recrystallized from dilute acetone, weight 83 mg. (theor. 86), M. P. 162–63°. The melting point was not depressed by 3(a),21-diacetoxy-11,20-diketo-12(a)-bromopregnane (M. P. 162–63°).

(b) 50 mg. purest bromide "b" was dissolved in 1 cc. benzene and 2.5 cc. glacial acetic acid and 100 mg. NaI added. Titration after 15 minutes used 1.75 cc. N/10 thiosulfate (theor. 1.70). It was worked up as under (a). Recrystallized material weighed 41 mg. (theor. 43), M. P. 162–63° and showed no depression with an authentic sample of 3(a),21-diacetoxy-11,20-diketo-12(a)-bromopregnane.

*3(a)21,21 - triacetoxy - 11,20 - diketo - 12(a)-bromopregnane (VII) from bromide "a" (III) and bromide "b" (IV) with silver acetate.*—590 mg. of either pure bromide "a" or pure bromide "b" was dissolved in 5 cc. benzene. 15 cc. glacial acetic acid and 334 mg. silver acetate were added and the mixture was agitated at room temperature for 45 hours. It was then filtered and washed with chloroform. The combined filtrates were washed with water, sodium bicarbonate solution and again with water and dried. The material which remained after removal of the chloroform was recrystallized from methanol, yielding from both bromide "a" and bromide "b" 88–89 per cent of pure 3(a),21,21-triacetoxy-11,20-diketo-12(a)-bromopregnane, M. P. 169.5–170.5, $(a)_D$ +35. This compound reduced both ammoniacal silver nitrate and phosphomolybdic acid, but less intensely than the ketol acetate (I).

Anal. Calcd. for $C_{27}H_{37}O_8Br$ (M=569.48). C, 56.94; H, 6.55; Br, 14.03. Found: C, 56.80; H, 6.30; Br, 13.75.

*3(a),21,21 - triacetoxy - 11,20 - diketo - 12(a)-bromopregnane (VII) from bromide "a" (III) and bromide "b" (IV) with sodium acetate.*—590 mg. of either pure bromide "a" or bromide "b" was mixed with 5 cc. of a M/3 sodium acetate solution in acetic acid and heated on the steam bath for 2 hours. Water was then added and the precipitate dissolved in chloroform. The latter was washed with water, bicarbonate and water and dried. After removal of the chloroform under reduced pressure the residue was recrystallized several times from methanol until the melting point reached 169.5–170.5°. This material gave no depression of its melting point when mixed with 3(a),21,21 - triacetoxy-11,20 - diketo - 12(a)-bromopregnane obtained by the silver acetate method. The yield of pure material was only about 60 per cent in spite of the quantitative removal of the bromine as judged by titration of the water washings.

*3(a),21,21 - triacetoxy - 11,20 - diketopregnane (XII) from 3(a),21,21-triacetoxy-11,20-diketo-12(a)-bromopregnane (VII).*—3.0 g. triacetate VII was dissolved in 60 cc. glacial acetic acid. This was cooled with cold water and 3.0 g. zinc dust added. It was then allowed to stand at room temperature for 1 hour, was filtered and the residue washed thoroughly with chloroform and water. The water-layer was titrated and was found to contain 5.3 m. eq. of bromide. The chloroform extract was washed with water, sodium bicarbonate and water, dried with sodium sulfate and evaporated. The residue crystallized from a little methanol after seeding. Weight 2.445 gm. (95%) M. P. 115–16° (short rods). After three recrystallizations from a little methanol the melting point was still the same. $(a)_D = +117°$.

Anal. Calcd. for $C_{27}H_{38}O_8$ (M=490.57). C, 66.10; H, 7.81. Found: C, 65.96; H, 7.87.

*3(a),acetoxy - 21,21 - dimethoxy - 11,20 - diketo-12(a)-bromopregnane (XI) from 3(a),21,21-triacetoxy - 11,20 - diketo - 12(a) - bromopregnane (VII).*—5.695 gm. of 3,21,21-triacetoxy-11,20-diketo-12-bromopregnane and 160 cc. of N/4 HCl in MeOH was refluxed for 2 hours. After cooling the solution was mixed with 10 gm. $K_2CO_3$ in 20 cc. water and it was then concentrated i. v. Some more water was added and it was concentrated further. It was extracted with chloroform, washed two times with water, dried and evaporated. To re-establish the acetoxy group at C-3 the residue was dissolved in 20 cc. pyridine and 20 cc. acetic anhydride added. It was allowed to stand at room temperature overnight. The next morning ice was added. After 20 minutes it was filtered and washed thoroughly with water. The material crystallized from dilute methanol in long, fine needles, weight 4.115 gm. (80 per cent), M. P. 153–58°. After two recrystallizations from dilute MeOH, the M. P. was constant at 157–59°. $(\alpha)_D$ +30°.

Anal. Calcd. for $C_{25}H_{37}O_6Br$ (M=513.47): C, 58.47; H, 7.26; $CH_3O$, 12.09. Found: C, 58.56; H, 6.96; $CH_3O$, 12.00.

3(a) - acetoxy - 21,21 - dihydroxy - 11,20 - diketo-12(a)-bromopregnane (VI) from bromide "a" (III) or bromide "b" (IV).—236 mg. (0.4 mm.) of either pure bromide "a" or pure bromide "b" was dissolved in 2 cc. of 80 per cent pyridine at room temperature. After 15 minutes from the time of mixing the colorless solution was poured into 2 cc. of 10 N $H_2SO_4$ and ice. It was filtered off and washed thoroughly with water, then dried. The filtrate was titrated for bromide and found to contain the theoretical amount. The dry reaction product was dissolved in acetic acid and water was added carefully. 142 mg. of small needles were obtained as the first, and 31 mg. as the second crop, a yield of 89 per cent. For analysis the first crop was once more recrystallized from dilute acetic acid, M. P. 120–140° with decomposition. When placed on the stage at 147° it melted at 149–51° with decomposition, $$(\alpha)_D = +28°$$

As the yellow color appeared in the chloroform solution the rotation dropped to $(\alpha)_D$ +26° (calculated as glyoxal).

Anal. Calcd. for $C_{23}H_{33}O_6Br$ (M=485.41): C, 56.91; H, 6.85; $CH_3CO$, 8.86. Found: C, 56.80; H, 7.11; $CH_3CO$, 8.92.

3(a) - acetoxy - 21,21-dimethoxy-11,20-diketo-12(a)-bromopregnane (XI) from 3(a)-acetoxy-21,21 - dihydroxy-11,20-diketo-12(a) - bromopregnane (VI).—100 mg. of crystalline hydrate of the glyoxal (VI) was dissolved in warm benzene, the solvent taken down to dryness i. v., the residue again dissolved in boiling benzene and concentrated i. v. This process was repeated once more. The benzene-free residue was now refluxed with 4 cc. MeOH, 0.25 normal with dry HCl for 2 hours. It was cooled and an excess $Na_2CO_3$ solution and ice was added. It was extracted with chloroform, washed until neutral, dried over sodium sulfate and evaporated. The residue was dissolved in 1 cc. dry pyridine and 1 cc. acetic anhydride added. After 2.5 hours at room temperature, ice was added. After about a half hour it was extracted with chloroform, the extract was washed once with dilute HCl, then with $NaHCO_3$ and with water, dried and evaporated. The residue was dissolved in methanol and water was added to turbidity. This was filtered through infusorial earth. More water was added to the filtrate, causing the acetal to crystallize, weight 41 mg., M. P. 152–57°. After one recrystallization from dilute acetone crystals were in the form of hairlike needles, weight 32 mg., M. P. 157–159°. The crystals showed no depression with the compound prepared from the triacetate.

3(a),21,21 - triacetoxy - 11,20 - diketo - 12(a) - bromopregnane (VII) from 3(a)-acetoxy - 21,21 - dihydroxy - 11,20 - diketo-12(a)-bromopregnane (VI).—100 mg. of crystalline glyoxal hydrate (VI) was dissolved with warming in 2 cc. acetic anhydride. The yellow solution was then cooled with ice and 1 drop concentrated $H_2SO_4$ added. The color disappeared within 2 seconds. After a half minute ice was added. It was kept at room temperature until the acetic anhydride was all decomposed, then it was filtered and thoroughly washed with water. Weight of the dried material, 114 mg. (theoretical 117 mg.), M. P. 156–64°. The crude material was recrystallized twice from a little methanol, yield 90 mg. (77 per cent), M. P. 167–68°. The crystals gave no depression with the triacetate obtained from the 21-bromo compounds.

Bromide "a" (III) and bromide "b" (IV) from 3(a) - acetoxy - 21,21 - dihydroxy - 11,20-diketo-12(a)-bromopregnane (VI).—1.0 gm. crystalline glyoxal hydrate was dissolved in 10 cc. acetyl bromide. 0.2 cc. concentrated $H_2SO_4$ (10 drops) was added. After 15 minutes at room temperature the mixture was diluted with 100 cc. ice cold chloroform and poured into a separatory funnel with ice. It was shaken vigorously until all the color had disappeared. The chloroform extract was once more shaken with ice, it was then washed with cold $NaHCO_3$ solution and twice with water, dried over sodium sulfate and concentrated to 122 cc. (a 1 per cent solution). Optical rotation: $(\alpha)_D = +36°$ (which is the rotation of a mixture of 56% bromide "a" and 44% bromide "b"). It was brought to dryness under reduced pressure. The residue was dissolved in 2 cc. chloroform and 10 cc. ligroin added. After cooling in an ice bath 623 mg. of crystals were obtained with $(\alpha)_D = +106°$. After five recrystallizations from $CHCl_3$-ligroin the rotation was $(\alpha)_D = +137°$, M. P. 180–82° with decomposition; there was no depression when mixed with pure bromide "a" of the same melting point.

The first mother liquor showed $(\alpha)_D = -32°$ indicating about 74 per cent of bromide "b." The product of this reaction is therefore quite similar to the mixture obtained after brominating the 3(a),21 - diacetoxy - 11,20 - diketo-12(a)-bromopregnane (I).

3(a) - acetoxy - 20 - hydroxy - 11-keto-12(a)-bromo-$\Delta^{17,20}$-pregnene-21-al (X) from 3(a)-acetoxy - 21,21 - dihydroxy - 11,20 - diketo - 12(a)-bromopregnane (VI).—1.30 gm. of crystalline 3(a) - acetoxy - 21,21 - dihyroxy - 11,20-diketo-12(a)-bromopregnane (VI) was dissolved in 20 cc. of a mixture of 4 parts of glacial acetic acid and 1 part of pyridine. This was heated at 60° for 16 hours. It was then poured into excess mineral acid and ice. The precipitate was filtered and washed thoroughly with water. The dry material weighed 1.09 gm. It had an absorption band in the ultraviolet light with a maximum at 284 m$\mu$, $\epsilon$=6,200 (chloroform). To separate the light-absorbing compound from by-products it was dissolved in benzene and passed through a column containing a mixture of 18 gm. magnesium silicate and 18 gm. infusorial earth. The material which was eluted with the first 500 cc. of benzene crystallized on the addition of methanol and had an extinction coefficient $\epsilon$=10,900. After several recrystallizations from dilute acetone the crystals melted at 190–91° and had $\lambda$max.=284 m$\mu$, $\epsilon$=13,650 (chloroform) and $(\alpha)_D = +96°$.

The compound reduced ammoniacal silver solution and showed a greenish brown color when a drop of alcoholic $FeCl_3$ solution was added to its solution in alcohol. With tetranitromethane it gave a weakly positive reaction. In chloroform solution it reacted with 1 mole of bromine within 15 minutes.

Anal. calcd. for $C_{23}H_{31}O_5Br$ (M=467.40). C, 59.09; H, 6.69; $CH_3CO$, 9.21. Found: C, 58.76; H, 6.94; $CH_3CO$, 9.79.

When the time of the reaction was varied, the following yields were obtained, based on the light absorption at 284 m$\mu$.

4 hours, 34% of X
7 hours, 40% of X 16 hours, 45% of X
32 hours, 39% of X

An increase in the rate of formation of X was noted when the amount of acetic acid was reduced; thus, with a mixture of equal parts of acetic acid and pyridine, the following values were found at 60°.

4 hours, 40% of X
7 hours, 45% of X while in pyridine alone the yields were decreased.

$3(\alpha),20$-diacetoxy-11-keto-12$(\alpha)$-bromo - $\Delta^{17,20}$-pregnene-21-al (XIII) from $3(\alpha)$-acetoxy-20-hydroxy-11-keto-12$(\alpha)$-bromo - $\Delta^{17,20}$ - pregnene-21-al (X).—234 mg. of X were dissolved in 5 cc. pyridine and 5 cc. acetic anhydride. After 1 hour at room temperature it was taken to dryness under reduced pressure. The residue was dissolved in a little chloroform, ligroin was added and the mixture concentrated until it began to become turbid. It crystallized soon in leaflets, yield 229 mg., M. P. 158–61°. On two recrystallizations from dilute acetone the melting point was constant at 162–64°. $(\alpha)_D = +86°$. The pure compound showed an absorption band with maximum at 249 m$\mu$ in methanol, but the absorption decreased continuously. When taken in ether the maximum was at 246 m$\mu$, $\epsilon = 12,500$. It reduced ammoniacal silver nitrate and took up bromine though at a much slower rate than the free enol.

Anal. Calcd. for $C_{25}H_{22}O_6Br$ (M=509.43). C, 58.94; H, 6.53; $CH_3CO$, 16.90. Found: C, 58.92; H, 6.48; $CH_3CO$, 16.97.

$3(\alpha),20$-diacetoxy-11-keto-12$(\alpha)$ - bromo-$\Delta^{17,20}$-pregnene-21-al (XIII) from bromide "a" (III) or bromide "b" (IV).—59.0 mg. of either pure bromide "a" or pure bromide "b" was dissolved in 1.0 cc. of a mixture of 3 parts acetic acid and 1 part pyridine and allowed to stand at room temperature for 45 hours. It was then diluted with benzene, washed with water, dilute HCl, water, bicarbonate solution and again with water, and dried over sodium sulfate. After removal of the benzene, the residue was dissolved in ether and the light absorption determined. From the 2 maxima at 245 m$\mu$ and 283 m$\mu$ it was determined that 51 per cent of the bromide had been converted to the enol acetate XIII while 11 per cent was the free enol X. When the relation of acetic acid to pyridine was varied but the other conditions, i. e., total volume, time and temperature were kept constant, the following results were obtained:

| Solvents used | | Reaction products formed | |
|---|---|---|---|
| Acetic acid | Pyridine | Enol acetate, per cent | enol, per cent |
| 100 | 0 | 0 | 0 |
| 90 | 10 | 40 | 3 |
| 75 | 25 | 51 | 11 |
| 50 | 50 | 29 | 34 |

When the time of the reaction was extended to five days, the amount of enol acetate generally decreased, while that of the enol increased.

$3(\alpha),20,21\,21$ - tetraacetoxy - 11 - keto - 12$(\alpha)$-bromo - $\Delta^{17,20}$pregnene (XIV) from $3(\alpha),20$-diacetoxy-11-keto-12$(\alpha)$-bromo - $\Delta^{17,20}$ - pregnene-21-al (XIII).—206 mg. enol acetate (XIII) was dissolved in 4 cc. acetic anhydride. It was cooled with ice and 2 drops of concentrated sulfuric acid were added. After a half minute ice was put in and the mixture allowed to stand at room temperature until all acetic anhydride was decomposed and the material could be filtered. It was washed with water and dried. The crude product weighed 236 mg. and melted at 93–115°. It was crystallized from a little acetone and petroleum ether. Yield, 172 mg., M. P. 150–52°. After three recrystallizations from dilute acetone M. P. was 154–55° (long needles). $(\alpha)_D = +60°$. The crystals absorbed 1 mole $Br_2$ within three hours.

Anal. Calcd. for $C_{29}H_{39}O_9Br$ (M=611.52). C, 56.96; H, 6.43. Found: C, 57.11; H, 6.23.

$3(\alpha)$-acetoxy-21,21 - dihydroxy - 11,20 - diketo-12$(\alpha)$,17-dibromopregnane (IX) from $3(\alpha),21$-diacetoxy - 11,20 - diketo - 12$(\alpha)$-bromopregnane (I).—10.22 gm. of I (20 mm.) was dissolved in 500 cc. glacial acid which contained 12.5 cc. bromine and 0.1 mole of dry hydrogen bromide. After 4 days at room temperature the solution was concentrated under reduced pressure to about 75 cc., 50 cc. 80 per cent acetic acid were added and removed under reduced pressure. The remainder was mixed with 50 to 75 cc. of benzene. When water was added white crystals separated at the interphase. Yield 3.4 gm. The material was purified by recrystallizing it several times from dilute acetic acid until the melting point was 206–08° with decomposition when placed on the stage at 203°. $(\alpha)_D = -34.5°$. The solution soon turned yellow and the rotation changed to $(\alpha)_D = -37°$ (calculated as glyoxal).

Anal. Calcd. for $C_{23}H_{32}O_6Br_2$ (M=564.33). C, 48.95; H, 5.72; Br. 28.32; $CH_3CO$, 7.63. Found: C, 48.84; H, 5.74; Br, 28.20; $CH_3CO$, 8.27.

$3(\alpha),21,21$-triacetoxy - 11,20-diketo - 12$(\alpha)$,17-dibromopregnane (VIII) from $3(\alpha)$,acetoxy-21,-21-dihydroxy-11,20 - diketo - 12$(\alpha)$,17 - dibromopregnane (IX).—50 mg. of IX was dissolved in 2 cc. acetic anhydride and 1 drop of concentrated sulfuric acid added. After a half minute the mixture was poured on ice. When all acetic anhydride was decomposed it was filtered and washed thoroughly with water. After drying the material was recrystallized first from a little methanol, M. P. 158–163°, then twice from dilute acetone when the melting point was constant at 167–69°. $(\alpha)_D = -24°$.

$3(\alpha),20$-dihydroxy-11-keto-12$(\alpha)$-bromo- $\Delta^{17,20}$-pregnene-21-al (XV) from $3(\alpha)$acetoxy-21,21-dihydroxy-11,20-diketo - 12$(\alpha)$,17 - dibromopregnane (IX).—1.128 g. of IX (2 millimoles was dissolved in 20 cc. warm methanol, 1.04 gm. (10 millimoles) of solid sodium bisulfite was added first, then slowly and with warming, 40 cc. water. The initial turbidity disappeared as the solution became hot. After 3–4 minutes at the boiling temperature crystals separated, weight 770 mg., M. P. 179–80° $(\alpha)_D = +90°$. After several recrystallizations from dilute acetone, M. P. 189.5–91° $(\alpha)_D =$ 101-, $\epsilon$max.=284 m$\mu$; $\epsilon = 10,900$ in methanol.

Anal. Calcd. for $C_{21}H_{29}O_4Br$ (M=425.36). C, 59.29; H, 6.87. Found: C, 59.16; H, 6.89; no acetyl.

$3(\alpha),21$ - diacetoxy - 11,20 - diketo - 12$(\alpha)$ - bromo-21$(\alpha)$-chloropregnane (XVI) from $3(\alpha)$-acetoxy - 21,21 - dihydroxy - 11,20 - diketo - 12$(\alpha)$-bromopregnane (VI).—337 mg. of VI was dissolved in 3 cc. acetyl chloride and 3 drops concentrated $H_2SO_4$ added. It was allowed to stand at room temperature for 1 hour, mixed with chloroform and shaken vigorously with ice. The chloroform layer was washed with water, sodium bicarbonate solution and again with water, and dried over sodium sulfate. The chloroform solution after being concentrated to about 1 per cent showed a specific rotation $(\alpha)_D = +31°$. On further concentration and addition of ligroin, 173 mg. of crystals hereinafter referred to as chloride "a" compound XVI were obtained, M. P. 160–78°, $(\alpha)_D = +63°$. Several recrystallizations from dilute acetone raised the melting point to a constant value of 189–91° and the rotation to $(\alpha)_D = +88°$. From the mother liquor a crop of crystals was obtained with $(\alpha)_D = -4°$ which on several recrystallizations gave pure chloride "b" with M. P. 153–54° and $(\alpha)_D = -35°$.

3($\alpha$) - acetoxy - 21,21 - dihydroxy - 11,20 - diketo - 12($\alpha$)-bromopregnane (VI) from chloride "a" (XVI).—29 mg. of pure chloride "a" was suspended in 0.5 cc. 80% pyridine. The crystals were in solution after ten minutes at room temperature. Twenty minutes later benzene was added and the mixture washed with excess sulfuric acid. The acid washings were titrated and found to contain 0.050 milli-equivalent chloride (94 percent of theory).

The benzene extract was washed with sodium bicarbonate and water and was taken to dryness. The residue was crystallized from dilute acetic acid, yield 23 mg. (89%), M. P. 148–49°, with yellow color.

All of the compounds I to XVI shown in the foregoing flow sheet, all of which excepting compound XII contain an acetate group at position 3, ketone at position 11 and bromine at position 12 are new. As is apparent, other acyloxy groups may be substituted for acetoxy at position 3 and chlorine (but not iodine) may be substituted for the bromine at 12. Likewise, other acyl oxy groups and other halogens may be substituted for acetoxy and bromine at positions 17, 20 and 21.

We claim:

1. Compounds of the formula:

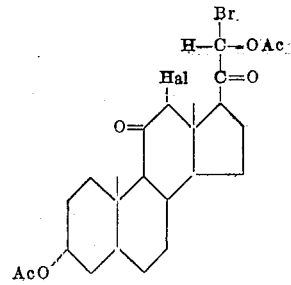

wherein Ac stands for an organic carboxylic acid radical and Hal stands for a halogen of the group consisting of chlorine and bromine.

2. 3($\alpha$),21 - diacetoxy - 11,20 - diketo - 12($\alpha$), 21-dibromopregnane.

3. The method which comprises reacting bromine with a 3($\alpha$),21 - diacyloxy - 11,20 - diketo - 12($\alpha$)-halopregnane in approximately equimolecular proportions to produce a 3($\alpha$),21-diacyloxy-11,20-diketo-12($\alpha$)-halo-21-bromopregnane.

4. The method which comprises reacting bromine with 3($\alpha$),21 - diacetoxy - 11,20 - diketo - 12($\alpha$)-bromopregnane in approximately equimolecular proportions to produce 3($\alpha$),21-diacetoxy - 11,20 - diketo - 12($\alpha$),21 - dibromopregnane.

5. The method as defined in claim 4 in which the reaction is carried out at about 0° C. in an anhydrous medium in the presence of hydrogen bromide.

6. The method as defined in claim 4 in which the reaction is carried out in chloroform at about 0° C. in the presence of hydrogen bromide.

EDWARD C. KENDALL.
GERARD A. FLEISHER.

No references cited.